United States Patent
Higuchi

(10) Patent No.: US 6,687,452 B1
(45) Date of Patent: Feb. 3, 2004

(54) MAGNETIC RECORDING DEVICE

(75) Inventor: Yoshio Higuchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/469,538

(22) Filed: Dec. 22, 1999

(30) Foreign Application Priority Data

Dec. 24, 1998 (JP) ............................................ 10-368202

(51) Int. Cl.⁷ ................................................. H04N 9/79
(52) U.S. Cl. ................................ 386/1; 386/26; 360/30
(58) Field of Search ................................ 386/1, 26, 37, 386/44, 45, 46; 360/29–30; H04N 9/79, 9/80, 5/76, 5/91, 7/00

(56) References Cited

U.S. PATENT DOCUMENTS 5,172,240 A * 12/1992 Nakazato ........................ 386/2
5,606,424 A * 2/1997 Jung ............................. 386/26

FOREIGN PATENT DOCUMENTS

| JP | 59-25876 | 2/1984 |
| JP | 6-303575 | 10/1994 |

\* cited by examiner

*Primary Examiner*—Thai Tran
(74) *Attorney, Agent, or Firm*—Myron Greenspan, Esq.; Lackenbach Siegel LLP

(57) ABSTRACT

A magnetic recording device provided with a frequency modulation circuit, a filter circuit, and a frequency conversion circuit. The frequency modulation circuit generates a modified FM luminance signal the frequency of a carrier wave of which is higher than that of an FM luminance signal and the relationship between the frequency of a sink chip and the frequency of a white peak of which is equal to the relationship between the frequency fs and the frequency fw of the FM luminance signal when the minimum frequency of the frequency band of the FM luminance signal is the frequency fa. The filter circuit removes a signal component lower than a cut-off frequency of signal components included in the modified FM luminance signal when a frequency. lower than the minimum frequency of the band of the modified FM luminance signal by a frequency acquired by doubling the frequency fa is the cut-off frequency. The frequency conversion circuit generates the above FM luminance signal by converting the frequency of output from the filter circuit by using a local oscillated signal of a frequency lower than the frequency of the carrier wave of the modified FM luminance signal.

3 Claims, 4 Drawing Sheets

MAGNETIC RECORDING DEVICE

BACKGROUND OF THE INVENTION

1. Field of the Invention

The present invention relates to a magnetic recording device for recording a frequency modulated (FM) luminance signal on a magnetic tape, and more specifically relates to a magnetic recording device wherein the deterioration of the quality of an image due to a turned sideband component is prevented.

2. Description of the Related Art

In a video cassette deck, to prevent resolution from being deteriorated due to the deterioration of S/N of a high frequency component in a luminance signal, an FM luminance signal is generated based upon a luminance signal the level of a high frequency component of which is enhanced beforehand by using a pre-emphasis circuit (first conventional technique).

Also, in another conventional technique proposed in Japanese Utility Model Unexamined Publication No. Sho. 59-25876, the quality of an image is prevented from being deteriorated by providing a variable trap circuit for removing a lower frequency component of an FM luminance signal to respective luminance signal recording processing circuit and luminance signal reproducing processing circuit (second conventional technique).

Also, there is still another conventional technique proposed in Japanese Patent Unexamined Publication No. Hei. 6-303575 and in this technique, a high frequency component extracted from a video signal is inserted during a vertical blanking interval and is recorded. The deterioration of resolution in case the traveling speed of a video tape is made slower than the standard speed is prevented by interpolating the high frequency component inserted during the vertical blanking interval in the decrease of a high frequency component caused in recording or reproduction in a double speed mode or a triple speed mode (third conventional technique).

However, if the first conventional technique is used, the following problem occurs. That is, if a luminance signal is a signal showing an extremely clear vertical-striped image, an FM luminance signal is a signal the degree of frequency modulation of which is high. In other words, the FM luminance signal is a signal including a high-level high-order sideband. Therefore, as the action of a pre-emphasis circuit is also required if a vertical-striped pattern becomes thin, a high-order sideband is generated in a range exceeding a frequency band defined as an FM luminance signal in the FM luminance signal.

Referring to FIG. 4, the above will be described (in FIG. 4, the frequency of a spectrum 80 represents the frequency of a carrier wave of an FM luminance signal). If a signal component the level of which is high of 2.5 MHz for example is included in a luminance signal, a secondary sideband and a tertiary sideband or a higher-order sideband is generated in addition to a primary sideband corresponding to the above signal component in the FM luminance signal. That is, on the side lower than the frequency of the carrier wave 80 of the FM luminance signal, a primary sideband 81, a secondary sideband 82 and a tertiary sideband 83 are generated. Also, on the side higher than the frequency of the carrier wave 80, a primary sideband, a secondary sideband and a tertiary sideband are similarly generated (higher-order sidebands than the tertiary sideband are not shown).

In the meantime, the frequency of the carrier wave 80 is approximately 4.5 MHz in NTSC system. Therefore, the secondary sideband 82 and the tertiary sideband 83 are signals turned up based upon a frequency of 0 Hz. Therefore, the secondary sideband 82 is turned up to be a sideband 92 and the tertiary sideband 83 is turned up to be a sideband 93. The turned sidebands 92 and 93 are signals in the frequency band of the FM luminance signal. As a result, there is a problem that the sidebands 92 and 93 act as a noise component mixed in the FM luminance signal and the quality of an image is deteriorated (a moire phenomenon occurs).

As the above second conventional technique is to prevent an FM luminance signal from being mixed in a low frequency converted chrominance signal, the effect of a sideband generated by the above turn cannot be removed. Also, as the above third conventional technique is to inhibit the decrease of a high frequency component generated when the traveling speed of a video tape is slow, the effect of a sideband generated by the turn cannot be similarly removed.

SUMMARY OF THE INVENTION

The present invention was made to solve the above problems and an object of the present invention is to provide a magnetic recording device wherein the deterioration of the quality of an image caused by turning a sideband can be prevented by acquiring an FM luminance signal of a predetermined frequency in frequency conversion after a modified FM luminance signal the frequency of a carrier wave of which is increased is generated and then, a signal component to be a signal in the frequency band of the FM luminance signal when a turn occurs is removed from the generated modified FM luminance signal.

To achieve the above object, according to a first aspect of the present invention, there is provided a magnetic recording device for recording an FM luminance signal the frequency corresponding to a sink chip of which is a frequency fs and the frequency corresponding to a white peak of which is a frequency fw on a magnetic tape, comprising: a frequency modulation circuit for generating a modified FM luminance signal that is an FM luminance signal the frequency of a carrier wave of which is set to a frequency higher than the frequency of a carrier wave of the FM luminance signal when a minimum frequency of the frequency band of the FM luminance signal is a frequency fa and the relative relationship between the frequency corresponding to the sink chip and the frequency corresponding to the white peak of which is equal to the relative relationship between the frequency fs and the frequency fw; a filter circuit for removing a signal component lower than a cut-off frequency of signal components included in the modified FM luminance signal when a frequency lower than a minimum frequency of the frequency band of the modified FM luminance signal by a frequency acquired by doubling the frequency fa is the cut-off frequency; and a frequency conversion circuit for generating the FM luminance signal by converting the frequency of the modified FM luminance signal sent from the filter circuit by using a local oscillated signal of a frequency lower than the frequency of the carrier wave of the modified FM luminance signal.

That is, the filter circuit removes a signal component of a frequency lower than the cut-off frequency. The cut-off frequency is a frequency lower than the minimum frequency of the frequency band of the modified FM luminance signal by a frequency acquired by doubling the frequency fa. Therefore, even if a turn occurs in frequency conversion, a turned signal component becomes a signal outside the band of the FM luminance signal. That is, the FM luminance signal sent from the frequency conversion circuit is a signal which does not include a sideband generated by a turn in its band.

Also, according to a second aspect of the present invention, there is provided a magnetic recording device for recording an FM luminance signal the frequency corresponding to a sink chip of which is a frequency fs and the frequency corresponding to a white peak of which is a frequency fw on a magnetic tape, comprising: a frequency modulation circuit for generating a modified FM luminance signal that is an FM luminance signal the frequency of a carrier wave of which is set to a frequency higher than the frequency of a carrier wave of the FM luminance signal when a minimum frequency of the frequency band of the FM luminance signal is a frequency fa, the difference between the frequency corresponding to the sink chip and the frequency corresponding to the white peak of which is equal to the difference between the frequency fs and the frequency fw and the relationship between the frequency corresponding to the sink chip and the frequency corresponding to the white peak of which is reverse to the relationship between the frequency fs and the frequency fw; a filter circuit for removing a signal component higher than a cut-off frequency of signal components included in the modified FM luminance signal when a frequency higher than a maximum frequency of the frequency band of the modified FM luminance signal by a frequency acquired by doubling the frequency fa is the cut-off frequency; and a frequency conversion circuit for generating the FM luminance signal by converting the frequency of the modified FM luminance signal sent from the filter circuit by using a local oscillated signal of a frequency higher than the frequency of the carrier wave of the modified FM luminance signal.

That is, the filter circuit removes a signal component of a frequency higher than the cut-off frequency. The cut-off frequency is a frequency higher than the maximum frequency of the frequency band of the modified FM luminance signal by a frequency acquired by doubling the frequency fa. Therefore, even if a turn occurs in frequency conversion, a turned signal component becomes a signal outside the band of the FM luminance signal. That is, the FM luminance signal sent from the frequency conversion circuit is a signal which does not include a sideband generated by a turn in its band.

DETAILED DESCRIPTION OF THE PREFERRED EMBODIMENTS

Figure 1:
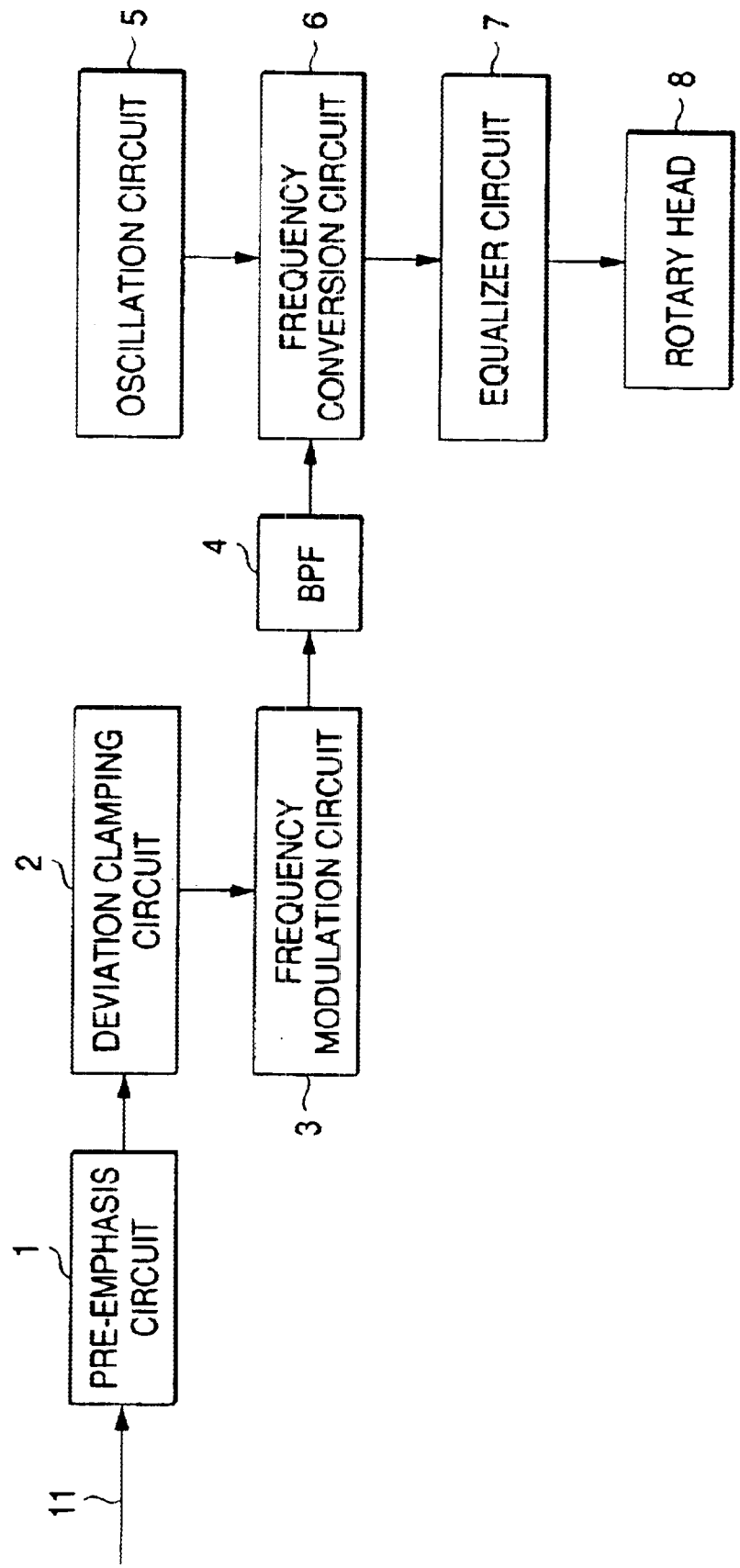
FIG. 1 is a block diagram showing the electric configuration of a magnetic recording device according to the present invention.

Referring to the drawings, embodiments of the present invention will be described below.

Figure 2:
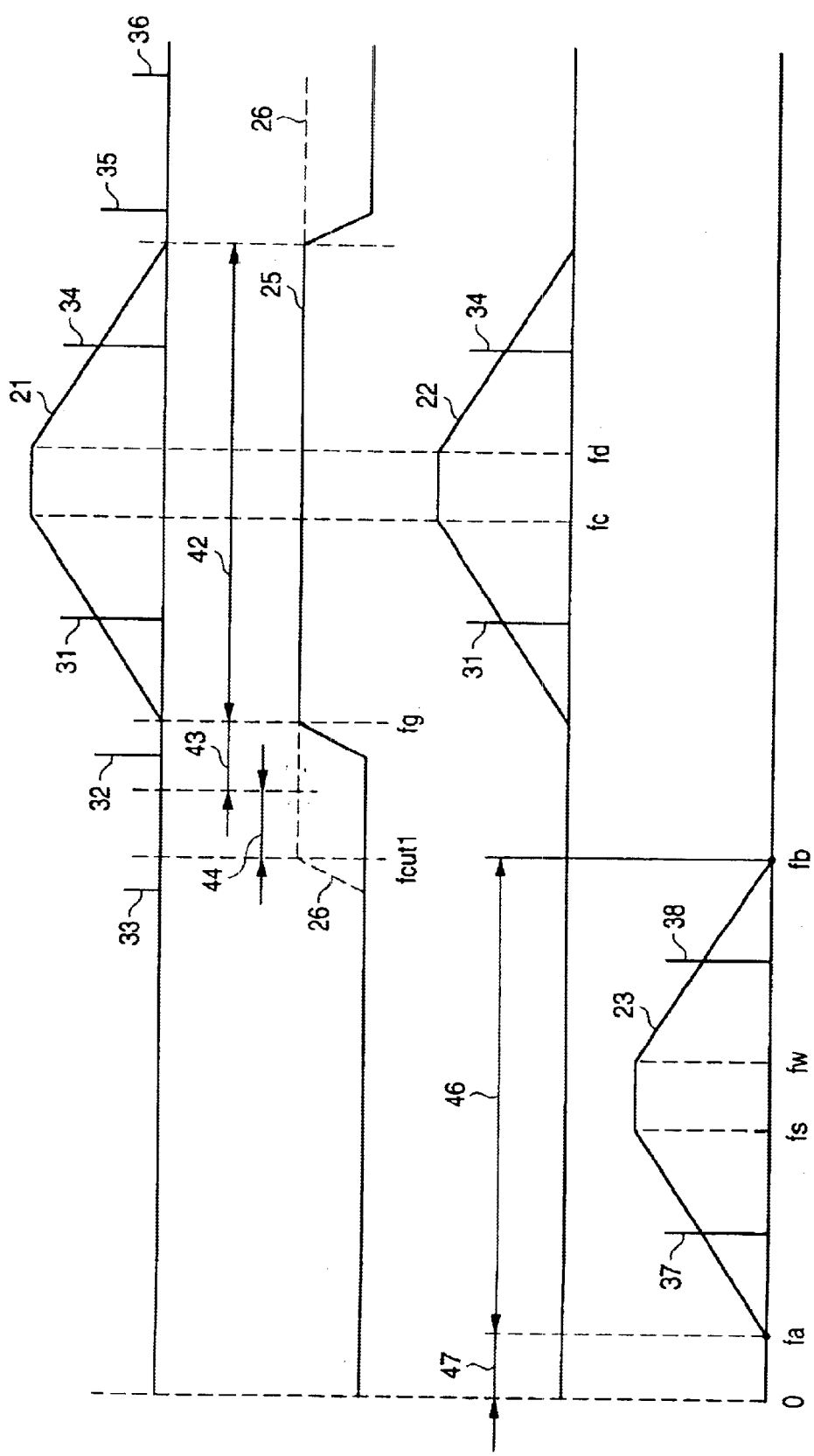
FIG. 2 is an explanatory diagram showing the spectra of a modified FM luminance signal and an FM luminance signal in an embodiment of the present invention.

FIG. 1 is a block diagram showing the electric configuration in an embodiment of a magnetic recording device according to the present invention and shows blocks for picture recording according to a luminance signal in NTSC system. FIG. 2 is an explanatory diagram showing the spectra of a modified FM luminance signal and an FM luminance signal.

As shown in FIG. 1, a pre-emphasis circuit 1 is a circuit for enhancing the level of a high frequency component beforehand to prevent the deterioration of resolution due to the deterioration of S/N of the high frequency component of a luminance signal 11 sent via a signal conductor. The luminance signal to which pre-emphasis has been applied is sent to a deviation clamping circuit 2. The deviation clamping circuit 2 clamps the level of a luminance signal so that the pedestal level of the luminance signal is fixed. The deviation clamping circuit also corrects the level of a luminance signal so that the frequency of an FM luminance signal corresponding to a sink chip in a luminance signal and the frequency of an FM luminance signal corresponding to a white peak are respectively predetermined frequencies. The corrected luminance signal is sent to a frequency modulation circuit 3.

The frequency modulation circuit 3 generates a modified FM luminance signal indicating a spectrum shown as 21 in FIG. 2 based upon the luminance signal output from the deviation clamping circuit 2 and sends it to a band-pass filter (filter circuit) 4. The frequency of a carrier wave of the modified FM luminance signal 21 is set to be higher than that of a carrier wave of an FM luminance signal 23.

The relative relationship between the frequency fc corresponding to the sink chip of the modified FM luminance signal 21 generated by the frequency modulation circuit 3 and the frequency fd corresponding to the white peak of the modified FM luminance signal 21 is equal to the relative relationship between the frequency fs corresponding to the sink chip of the FM luminance signal 23 defined in NTSC system and the frequency fw corresponding to the white peak of the FM luminance signal 23.

That is, as the relationship between the frequency fs (4.4 MHz) corresponding to the sink chip of the EM luminance signal 23 and the frequency fw (5.4 MHz) corresponding to the white peak is fs<fw, the relationship between the frequency fc corresponding to the sink chip of the modified FM luminance signal 21 and the frequency fd corresponding to the white peak is fc<fd. The difference between the frequency fc and the frequency fd is 1 MHz equal to the difference between the frequency fs and the frequency fw.

The filter circuit 4 functions as a filter for removing a predetermined range of sideband component from the FM luminance signal 21 generated by the frequency modulation circuit 3 (described later). An oscillation circuit 5 generates a local oscillated signal of 10 MHz which is lower than the frequency of a carrier wave of the modified FM luminance signal 21 output from the frequency modulation circuit 3 and which is higher than the maximum frequency fb of the frequency band 46 of the FM luminance signal 23 and outputs it to the frequency modulation circuit 3.

A frequency conversion circuit 6 converts the frequency of the modified FM luminance signal 22 sent from the filter circuit 4 to the frequency of the FM luminance signal 23 defined in NTSC system based upon the local oscillated signal sent from the oscillation circuit 5. That is, the frequency conversion circuit 6 converts the frequency fc (14.4 MHz) corresponding to the sink chip of the modified FM luminance signal 21 generated by the frequency modulation circuit 3 to the frequency of 4.4 MHz corresponding to the sink chip of the FM luminance signal 23 in NTSC system.

The frequency conversion circuit 6 also converts the frequency fd (15.4 MHz) corresponding to the white peak of the FM luminance signal 21 to the frequency of 5.4 MHz corresponding to the white peak of the FM luminance signal 23.

An equalizer circuit 7 corrects the level characteristic of the FM luminance signal sent from the frequency conversion circuit 6 corresponding to the frequency characteristic in recording of a rotary head 8. The equalizer circuit 7 also removes a signal component overlapped with the frequency band of a low frequency converted chrominance signal. Each of the above pre-emphasis circuit 1, the deviation clamping circuit 2 and the equalizer circuit 7 has a well-known configuration.

The reason why the local oscillated signal is set to 10 MHz will be described below. That is, the local oscillated signal output from the oscillation circuit 5 is also included as a high-level signal in addition to the FM luminance signal 23 the frequency of which has been converted, in the output of the frequency conversion circuit 6. Therefore, the local oscillated signal is sent to the rotary head 8 together with the FM luminance signal 23 and is recorded on a magnetic tape. Therefore, if the frequency of the local oscillated signal is lower than the maximum frequency fb, the local oscillated signal is included in a reproduced signal and the quality of an image in reproduction is deteriorated. That is, to prevent the deterioration of the quality of an image, the frequency of the local oscillated signal is required to be set so that it is higher than 8 MHz which is the maximum frequency fb of the frequency band 46.

The details of the filter circuit 4 will be described below. Suppose that the minimum frequency of the frequency band 46 of the FM luminance signal 23 in NTSC system is a frequency fa, the minimum frequency of the frequency band 42 of the modified FM luminance signal 21 is a frequency fg (frequency bandwidth 42 is equal to frequency bandwidth 46) and a frequency lower than the minimum frequency fg by a frequency acquired by doubling the frequency fa is a cut-off frequency fcut1. Also, suppose that frequency bandwidths 43 and 44 are both fa.

As described above, the frequency of the modified FM luminance signal 21 generated by the frequency modulation circuit 3 is converted to the frequency of the FM luminance signal 23 equal to a frequency according to NTSC system. Therefore, a signal component in the frequency band 43 is converted to a signal in the frequency band 47 ranged from 0 to the frequency fa. A signal component in the frequency band 44 is turned up in frequency conversion to be a signal in the frequency band 47 ranged from 0 to the frequency fa. A signal component in a frequency band lower than the cut-off frequency fcut1 of signal components in the modified FM luminance signal 21 becomes a signal which enters the frequency band 46 when the above signal component is turned up in frequency conversion.

The above means that if a signal component in a frequency band lower than the cut-off frequency fcut1 is removed from the modified FM luminance signal 21, there is no signal component which enters the frequency band 46 even if a turn occurs in frequency conversion. Therefore, the filter circuit 4 is required to remove a signal component the frequency of which is lower than the cut-off frequency fcut1. That is, the filter circuit 4 is required to be provided with a low-cut characteristic shown by a broken line 26.

In this embodiment, the filter circuit 4 functions as a band-pass filter which passes only a signal component in the frequency band 42 to prevent an unnecessary signal component from being generated due to interference between signal components in the frequency conversion circuit 6 (the characteristic of passage is shown by a solid line 25). Therefore, as signal components in the frequency bands 43 and 44 are also removed, an FM luminance signal acquired by frequency conversion is a signal from which a signal component in the frequency band 47 is removed. Therefore, an effect upon the low frequency converted chrominance signal can be more reduced.

The operation of the embodiment having the above configuration will be described below.

A luminance signal the high frequency component of which is increased by the pre-emphasis circuit 1 and the level of which is adjusted by the deviation clamping circuit 2 is sent to the frequency modulation circuit 3. The frequency modulation circuit 3 generates the modified FM luminance signal 21 based upon the sent luminance signal. Suppose that the luminance signal 11 is a signal showing an extremely clear thin vertical-striped image. Therefore, suppose that in the modified FM luminance signal 21, primary sidebands 31 and 34 are generated, and secondary sidebands 32 and 35 and tertiary sidebands 33 and 36 are generated.

The filter circuit 4 removes a component of a frequency lower than the frequency band 42 and a component of a frequency higher than the frequency band 42. Therefore, the modified FM luminance signal 22 output from the filter circuit 4 is a signal from which the secondary sidebands 32 and 35 and the tertiary sidebands 33 and 36 have been removed. The frequency of the modified FM luminance signal 22 output from the filter circuit 4 is converted by the frequency conversion circuit 6. Therefore, the FM luminance signal shown as 23 which meets a specification in NTSC system is output from the frequency conversion circuit 6. That is, the FM luminance signal 23 is a signal from which the effect of the secondary sideband 32 and the tertiary sideband 33 which cause a moire phenomenon has been removed though the FM luminance signal includes primary sidebands 37 and 38.

When the filter circuit 4 is a high-pass filer the cut-off frequency of which is fg for example, the modified FM luminance signal 22 sent to the frequency conversion circuit 6 includes the sidebands 35 and 36. However, the sidebands 35 and 36 do not become a signal turned up in frequency conversion but becomes a signal of a frequency higher than the frequency band 46 after frequency conversion. Therefore, the effect of the sidebands 35 and 36 may be actually ignored.

When the filter circuit 4 is a high-pass filter the cut-off frequency of which is fcut1 for example, the modified FM luminance signal 22 sent to the frequency conversion circuit 6 becomes a signal including the sideband 32 and the sidebands 35 and 36. However, the sidebands 35 and 36 do not become a signal turned up in frequency conversion but becomes a signal the frequency of which is higher than the frequency band 46 after frequency conversion. Therefore, the effect of the sidebands 35 and 36 may be actually ignored. The sideband 32 is turned after frequency conversion and becomes a signal in the frequency band 47, however, it is removed by the equalizer circuit 7. Therefore, the effect of the sideband 32 may be actually approximately ignored.

Another embodiment of a magnetic recording device according to the present invention will be described below. The electric configuration of a luminance signal recording circuit used in this embodiment is the same as that of the block diagram shown in FIG. 1. Therefore, referring to FIG.

1, the configuration will be described only in relation to points different from those in the above-described embodiment.

Figure 3:
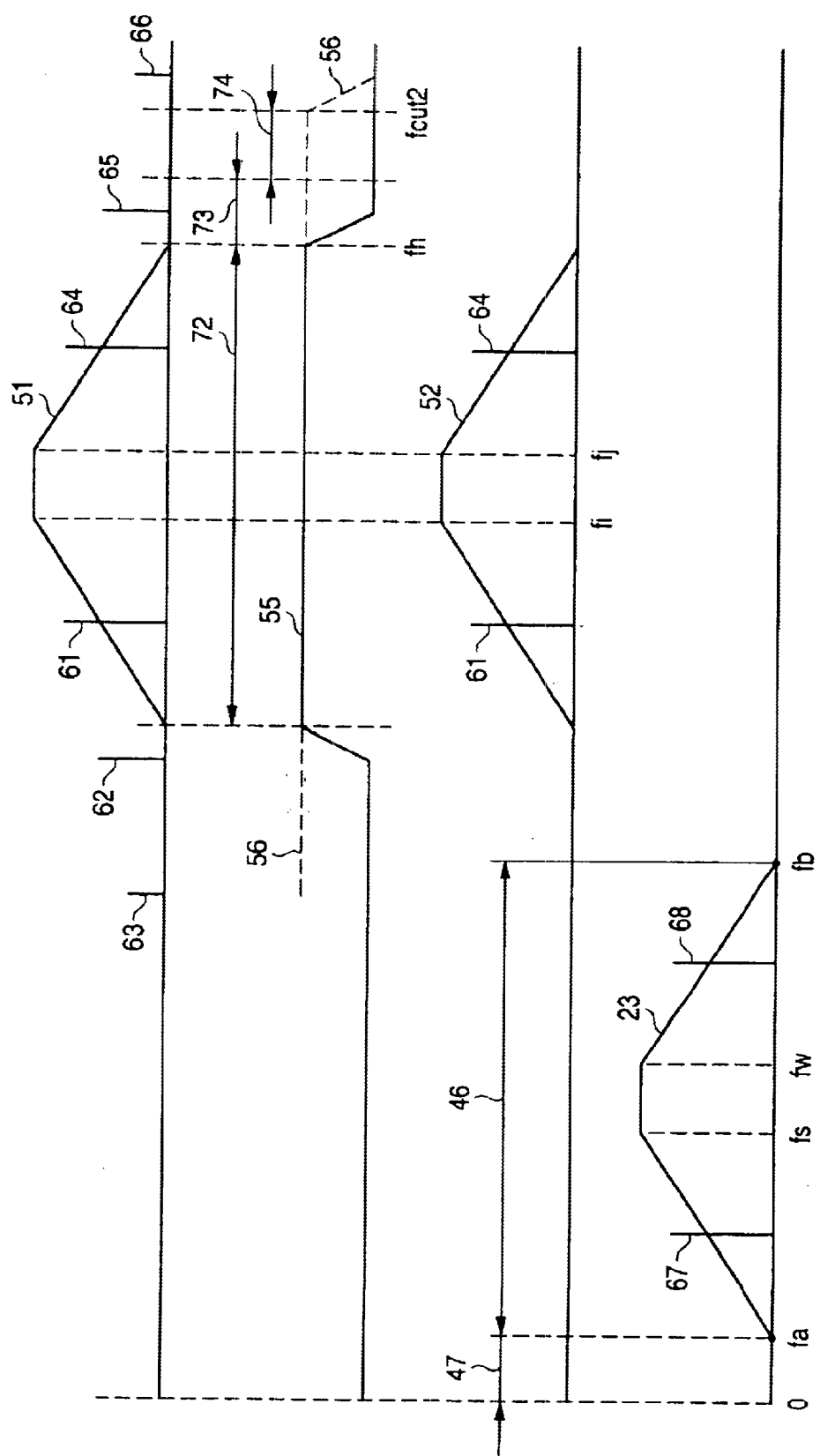
FIG. 3 is an explanatory diagram showing the spectra of a modified FM luminance signal and an FM luminance signal in another embodiment of the present invention.
Figure 4:
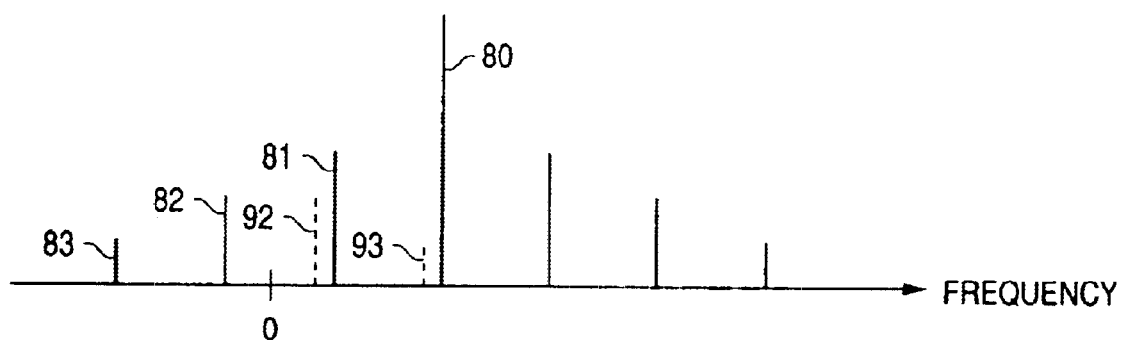
FIG. 4 is an explanatory diagram showing the spectrum of an FM luminance signal in a conventional technique.

A frequency modulation circuit 3 generates a modified FM luminance signal indicating a spectrum shown as 51 in FIG. 3 based upon a luminance signal output from a deviation clamping circuit 2 and sends it to a band-pass filter 4. The relationship between the frequency fj corresponding to the sink chip of the modified FM luminance signal 51 generated by the frequency modulation circuit 3 and the frequency fi corresponding to the white peak of the modified FM luminance signal 51 is fi<fj. That is, the frequency fj corresponding to the sink chip is higher than the frequency fi corresponding to the white peak. That is, the modified FM luminance signal 51 is a signal the relationship between a higher frequency and a lower frequency of which is reverse to the relationship described in the above first embodiment in correspondence with an FM luminance signal 23 according to NTSC system.

The difference between the frequency fi and the frequency fj is equal to the difference (1 MHz) between the frequency fs (4.4 MHz) corresponding to the sink chip of the FM luminance signal 23 defined in NTSC system and the frequency fw (5.4 MHz) corresponding to the white peak. In detail, the frequency fi corresponding to the white peak of the modified FM luminance signal 51 is 12.6 MHz and the frequency fj corresponding to the sink chip is 13.6 MHz.

An oscillation circuit 5 generates a local oscillated signal of a higher frequency than the frequency of a carrier wave of the modified FM luminance signal 51 output from the frequency modulation circuit 3 and outputs it to the frequency modulation circuit 3. The frequency of the local oscillated signal is 18 MHz. Therefore, the frequency fj corresponding to the sink chip is converted to 4.4 MHz equal to the frequency fs corresponding to the sink chip of the FM luminance signal 23 in NTSC system. The frequency fi corresponding to the white peak is converted to 5.4 MHz equal to the frequency fw corresponding to the white peak of the FM luminance signal 23 in NTSC system.

The details of the filter circuit 4 will be described below. Suppose that the minimum frequency of the frequency band 46 of the FM luminance signal 23 in NTSC system is a frequency fa, the maximum frequency of the frequency band 72 of the modified FM luminance signal 51 is a frequency fh (frequency bandwidth 72 is equal to frequency bandwidth 46) and a frequency higher than the maximum frequency fh by a frequency acquired by doubling the frequency fa is a cut-off frequency fcut2. Also, suppose that each bandwidth of the frequency band 73 and the frequency band 74 is fa.

As described above, the frequency of the modified FM luminance signal 51 generated by the frequency modulation circuit 3 is converted to the frequency of the FM luminance signal 23 equal to a frequency in NTSC system. Therefore, a signal component in the frequency band 73 is converted to a signal in the frequency band 47 ranged from 0 to the frequency fa. A signal component in the frequency band 74 is turned up in frequency conversion and becomes a signal in the frequency band 47 ranged from 0 to the frequency fa. A signal component in a frequency band higher than the cut-off frequency fcut2 of signal components in the modified FM luminance signal 51 becomes a signal which enters the frequency band 46 when the above signal component is turned up in frequency conversion.

The above means that if a signal component in a frequency band higher than the cut-off frequency fcut2 is removed from the modified FM luminance signal 51, there is no signal component which enters the frequency band 46 even if a turn occurs in frequency conversion. Therefore, the filter circuit 4 is required to remove a signal component the frequency of which is higher than the cut-off frequency fcut2. That is, the filter circuit 4 is required to be provided with a high-cut characteristic shown by a broken line 56.

In this embodiment, the filter circuit 4 is a band-pass filer which passes only the frequency band 72 to prevent an unnecessary signal component from being generated due to interference between signal components, in the frequency conversion circuit 6 (the characteristic of passage is shown by a solid line 55). Therefore, as signal components in the frequency bands 73 and 74 are also removed, an FM luminance signal acquired in frequency conversion is a signal a signal component in the band 47 of which has been removed. Therefore, an effect upon the low frequency converted chrominance signal can be more reduced.

The operation of the embodiment having the above configuration will be described below.

A luminance signal the high frequency component of which is increased by the pre-emphasis circuit 1 and the level of which is adjusted by the deviation clamping circuit 2 is sent to the frequency modulation circuit 3. The frequency modulation circuit 3 generates the modified FM luminance signal 51 based upon the sent luminance signal. Suppose that the luminance signal 11 is a signal showing an extremely clear thin vertical-striped image. Therefore, suppose that in the modified FM luminance signal 51, primary sidebands 61 and 64 are generated, and secondary sidebands 62 and 65 and tertiary sidebands 63 and 66 are generated.

The filter circuit 4 removes a component of a frequency higher than the frequency band 72 and a component of a frequency lower than the frequency band 72. Therefore, the modified FM luminance signal 52 output from the filter circuit 4 is a signal from which the secondary sidebands 62 and 65 and the tertiary sidebands 63 and 66 have been removed. The frequency of the modified FM luminance signal 52 output from the filter circuit 4 is converted by the frequency conversion circuit 6. Therefore, an FM luminance signal shown as 23 which meets a specification in NTSC system is output from the frequency conversion circuit 6. That is, the FM luminance signal 23 is a signal from which the effect of the secondary sideband 65 and the tertiary sideband 66 which cause a moire phenomenon has been removed though the FM luminance signal includes primary sidebands 67 and 68.

When the filter circuit 4 is a low-pass filter the cut-off frequency of which is fh for example, the modified FM luminance signal 52 sent to the frequency conversion circuit 6 includes the sidebands 62 and 63. However, the sidebands 62 and 63 do not become a signal turned up in frequency conversion but becomes a signal of a frequency higher than the frequency band 46 after frequency conversion. Therefore, the effect of the sidebands 62 and 63 may be actually ignored.

Also, when the filter circuit 4 is a low-pass filter the cut-off frequency of which is fcut2 for example, the modified FM luminance signal 52 sent to the frequency conversion circuit 6 includes the sideband 65 and the sidebands 62 and 63. However, the sidebands 62 and 63 do not become a signal turned up in frequency conversion but becomes a signal the frequency of which is higher than the frequency band 46 after frequency conversion. Therefore, the effect of the sidebands 62 and 63 may be actually ignored. The sideband 65 is turned up after frequency conversion and becomes a signal in the frequency band 47, however, it is removed by the equalizer circuit 7. Therefore, the effect of the sideband 65 may be actually approximately ignored.

The present invention is not limited to the above embodiments and the case that the present invention is applied to an FM luminance signal in NTSC system is described above, however, the present invention can be similarly applied to an FM luminance signal in PAL system, for example.

As described above, according to the present invention, when a turn occurs in frequency conversion, a turned signal component also becomes a signal outside the band of the FM luminance signal. That is, the FM luminance signal sent from the frequency conversion circuit is a signal which does not include a sideband generated by a turn in its band. Therefore, the deterioration of the quality of an image caused by the turn of a sideband can be prevented.

What is claimed is:

1. A magnetic recording device for recording an FM luminance signal the frequency corresponding to a sink chip of which is a frequency fs and the frequency corresponding to a white peak of which is a frequency fw on a magnetic tape, comprising:

a frequency modulation circuit for generating a modified FM luminance signal that is an FM luminance signal the frequency of a carrier wave of which is set to a frequency higher than the frequency of a carrier wave of said FM luminance signal when a minimum frequency of the frequency band of the FM luminance signal is a frequency fa and the relative relationship between the frequency corresponding to the sink chip and the frequency corresponding to the white peak of which is equal to the relative relationship between the frequency fs and the frequency fw;

a filter circuit for removing a signal component lower than a cut-off frequency of signal components included in the modified FM luminance signal when a frequency lower than a minimum frequency of the frequency band of the modified FM luminance signal by a frequency acquired by doubling the frequency fa is the cut-off frequency; and a frequency conversion circuit for generating the FM luminance signal by converting the frequency of the modified FM luminance signal sent from said filter circuit by using a local oscillated signal of a frequency lower than the frequency of the carrier wave of the modified FM luminance signal.

2. The magnetic recording device according to claim 1, wherein the frequency of the local oscillated signal is set to be higher than a maximum frequency of the frequency band of the FM luminance signal.

3. A magnetic recording device for recording an FM luminance signal the frequency corresponding to a sink chip of which is a frequency fs and the frequency corresponding to a white peak of which is a frequency fw on a magnetic tape, comprising:

a frequency modulation circuit for generating a modified FM luminance signal that is an FM luminance signal the frequency of a carrier wave of which is set to a frequency higher than the frequency of a carrier wave of the FM luminance signal when a minimum frequency of the frequency band of said FM luminance signal is a frequency fa, the difference between the frequency corresponding to the sink chip and the frequency corresponding to the white peak of which is equal to the difference between the frequency fs and the frequency fw and the relationship between the frequency corresponding to the sink chip and the frequency corresponding to the white peak of which is reverse to the relationship between the frequency fs and the frequency fw;

a filter circuit for removing a signal component higher than a cut-off frequency of signal components included in the modified FM luminance signal when a frequency higher than a maximum frequency of the frequency band of the modified FM luminance signal by a frequency acquired by doubling the frequency fa is the cut-off frequency; and a frequency conversion circuit for generating the FM luminance signal by converting the frequency of the modified FM luminance signal sent from said filter circuit by using a local oscillated signal of a frequency higher than the frequency of the carrier wave of the modified FM luminance signal.

* * * * *